United States Patent [19]

Schwarz et al.

[11] Patent Number: 4,487,016
[45] Date of Patent: Dec. 11, 1984

[54] MODULATED CLEARANCE CONTROL FOR AN AXIAL FLOW ROTARY MACHINE

[75] Inventors: Frederick M. Schwarz, Glastonbury; James G. Griffin, West Hartford, both of Conn.

[73] Assignee: United Technologies Corporation, Hartford, Conn.

[21] Appl. No.: 192,743

[22] Filed: Oct. 1, 1980

[51] Int. Cl.³ .................................................. F02C 7/18
[52] U.S. Cl. .................................... 60/204; 60/226.1; 60/39.75; 415/116; 415/138
[58] Field of Search .................. 60/39.75, 226 R, 262, 60/266, 726, 728, 204; 415/115, 116, 117, 126, 127, 128, 134, 136, 137, 138; 137/98; 165/39

[56] References Cited

U.S. PATENT DOCUMENTS

| | | | |
|---|---|---|---|
| 3,039,737 | 6/1962 | Kolthoff, Jr. | 415/17 |
| 3,575,528 | 4/1971 | Beam, Jr. et al. | 416/39 |
| 3,736,069 | 5/1973 | Beam, Jr. et al. | 415/115 |
| 3,742,705 | 7/1973 | Sifford | 415/117 |
| 3,921,658 | 11/1975 | Botnick | 137/98 |
| 3,966,354 | 6/1976 | Patterson | 415/116 |
| 3,975,901 | 8/1976 | Hallinger et al. | 60/39.14 |
| 4,005,946 | 2/1977 | Brown et al. | 415/136 |
| 4,019,320 | 4/1977 | Redinger et al. | 60/226 |
| 4,023,731 | 5/1977 | Patterson | 415/116 |
| 4,069,662 | 1/1978 | Redinger, Jr. et al. | 60/226 R |
| 4,127,357 | 11/1978 | Patterson | 415/116 |
| 4,173,120 | 11/1979 | Grosjean et al. | 60/39.161 |
| 4,279,123 | 7/1981 | Griffin et al. | 60/226 R |
| 4,304,093 | 12/1981 | Schulze | 60/226 R |

Primary Examiner—Carlton R. Croyle
Assistant Examiner—Jeffrey A. Simenauer
Attorney, Agent, or Firm—Gene D. Fleischhauer

[57] ABSTRACT

A structure and method for providing cooling fluids from a compression section 10 to a turbine section 14 of an axially flow rotary machine is disclosed. Various construction details and steps of the method enable the machine to minimize the effect that unscheduled variations in the temperature of the cooling fluids have on operating clearances in the turbine section. These unscheduled variations may result from changes in ambient temperature and component deterioration. An internal cooling fluid from the discharge region 52 of the rearmost compressor 18 is used to modulate the flow of a second fluid impinged on the exterior of the outer case 24 for controlling the clearance between an array of rotor blades 26 and a coolable stator shroud 64 spaced radially outwardly of the rotor blades. In one embodiment, a valve 32 for modulating the flow of the second fluid has at least one thermostatic bimetallic spring 86 for transducing a change in temperature into a displacement. The displacement changes the flow area $A_f$ between a valve head 82 and a conical seat 80 in the conduit 30 for the second fluid through the valve 32.

8 Claims, 10 Drawing Figures

MODULATED CLEARANCE CONTROL FOR AN AXIAL FLOW ROTARY MACHINE

DESCRIPTION

1. Technical Field

This invention relates to axial flow rotary machines and more particularly to a structure and a method for controlling the radial clearance between rotating components and stationary components in the turbine section of such an engine.

2. Background Art

Axial flow rotary machines such as gas turbine engines typically have a compression section, a combustion section and a turbine section. During operation of the rotary machine, working medium gases are flowed through these sections of the engine. The gases are compressed in the compression section, burned with fuel in the combustion section and expanded in the turbine section. A rotor assembly extends axially through the turbine section. The rotor assembly is adapted by a plurality of rotor stage assemblies to receive energy from the working medium gases. Each rotor stage assembly includes a disk and a plurality of rotor blades extending outwardly from the disk across the working medium flow path. A stator structure circumscribes the rotor structure. The stator structure often includes a shroud such as a plurality of outer air seals which circumscribes the rotor blades. The circumscribing shroud is spaced from the rotor assembly to accommodate differences in transient growth between the rotor stage assembly and the stator structure. However, the clearance allows the working medium gases to flow past the tips of the rotor blades instead of following the working medium flow path through the rotor blades. Such leakage of the working medium over the blade tips limits the obtainable stage efficiency and engine performance.

In modern engines, the tip clearance between the rotor blades and the outer air seal is reduced by cooling a portion of the engine case. In addition, a cooling medium, such as air pressurized by an upstream compression stage, is typically used to cool the internal components of the engine such as the disk, the outer air seal and the rotor blades which are bathed in the hot working medium gases to extend their service life. This internal cooling medium also affects the radial clearance between the rotor blades and the outer air seal. U.S. Pat. No. 4,069,662 issued to Redinger et al entitled "Clearance Control for Gas Turbine Engine" and U.S. Pat. No. 4,019,320 to Redinger et al. entitled "External Gas Turbine Engine Cooling for Clearance Control" are representative of structures in which the diameter of the circumscribing stator structure is reduced by cooling a portion of the case. As shown in Redinger et al., cooling air from an upstream compression stage is ducted externally of the engine and impinged on the exterior of the outermost stator structure to cool the stator structure and to cause it to shrink inwardly to maintain the clearance at some predetermined minimum value over a portion of the engine cycle.

Figure 9:
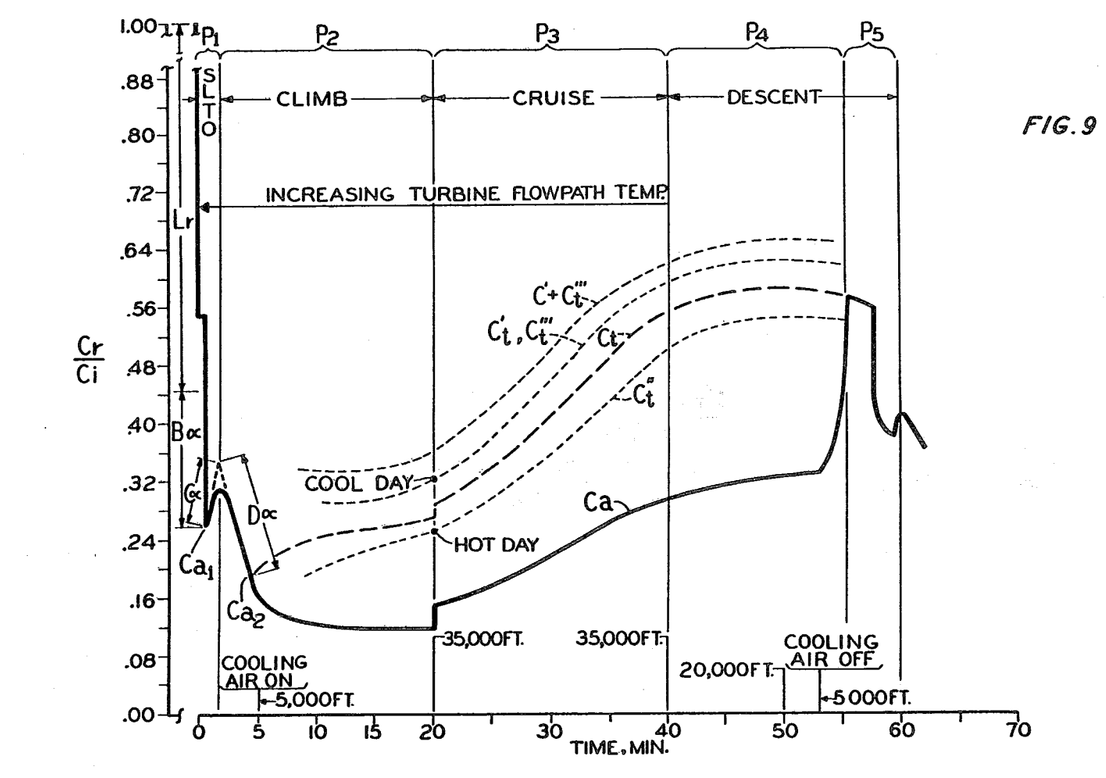
FIG. 9 is a graphical representation of the normalized radial clearance $C_r$ during different periods of the flight of an aircraft containing the gas turbine engine.

Many modern jet aircraft are designed to operate on commuter routes involving flights of relatively short duration as compared with those aircraft flying transoceanic routes. FIG. 9 shows the clearance as a function of time during a flight cycle for a commuter route. On such a commuter route the aircraft may spend one-third of its flight taking off and climbing to altitude, cruising for one-third of the flight duration and descending and landing during the last one-third of the flight. It is desirable to have clearance control over a large portion of the flight cycle to maximize engine performance. In addition, it is desirable to automatically take into account variations in clearance which result from changes in ambient temperature and component deterioration to insure that the clearances are not unnecessarily large to accommodate such variations.

DISCLOSURE OF INVENTION

According to the present invention, the temperature of a fluid discharged from the rearmost compressor, the fluid being flowed aft in a gas turbine engine for cooling a portion of a rotor stage assembly and a circumscribing shroud positioned inwardly of an outer case, is used to regulate the flow of cooling air impinging on the exterior of the outer case for clearance control to take into account the effect that changes in ambient air temperature and component deterioration have on the radial clearance between the tips of the rotor blades and the circumscribing shroud.

In accordance with one embodiment of the present invention, a valve for controlling the flow of external cooling air is directly sensitive to the temperature of the fluid used for cooling the rotor assembly and the circumscribing shroud.

A primary feature of the present invention is the discharge region of the rearmost compressor. The region supplies a first fluid used to regulate the radial clearance between the tips of an array of rotor blades and a stator shroud circumscribing the blades. Another feature is an outer case outwardly of the shroud and the rotor assembly which is cooled by a second fluid impinging on the exterior of the outer case. The flow rate of the second fluid is a function of the temperature of the first fluid. A valve for modulating the flow of the second fluid has a plurality of thermostatic bimetallic springs responsive to the temperature of the first fluid.

A principal advantage of the present invention is the increased efficiency which results from maintaining an effective clearance between the tips of an array of rotor blades and the circumscribing shroud. A predetermined clearance substantially unaffected by changes in ambient temperature results from modulating the cooling air impinging on the outer case with the temperature of the fluid discharged from the rearmost compressor because of the relationship between the radial clearance in the turbine and the temperature of the fluid in the discharge region of the rearmost compressor. In one embodiment, mechanical reliability and simplicity results from using a valve having bimetallic elements for modulating the flow which are directly sensitive to the temperature of the first fluid.

The foregoing and other objects, features and advantages of the present invention will become more apparent in the light of the following detailed description of the preferred embodiment thereof as shown in the accompanying drawing.

BEST MODE FOR CARRYING OUT THE INVENTION

Figure 1:
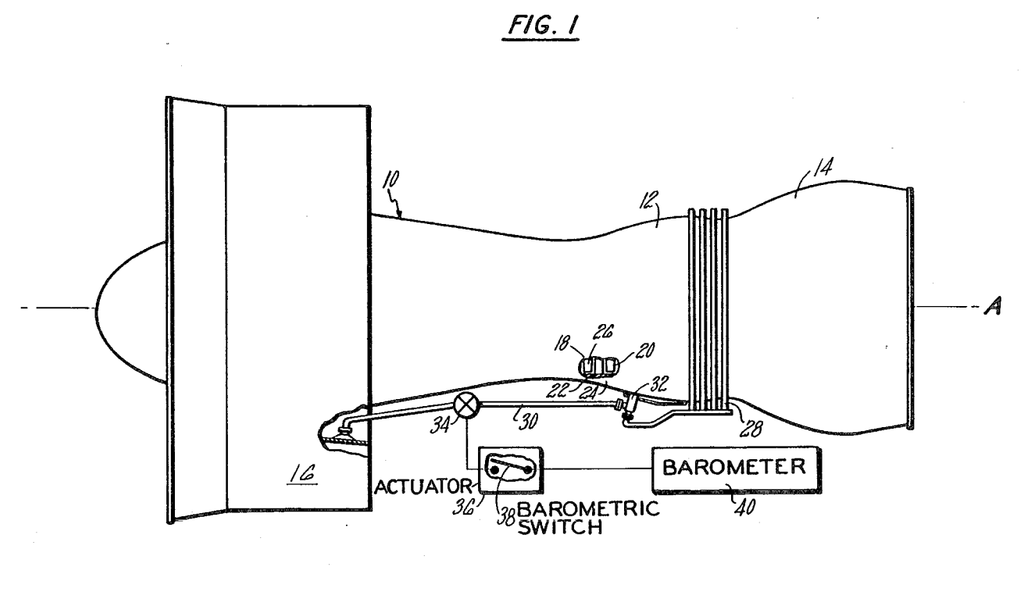
FIG. 1 is a side elevation view of a gas turbine engine with the outer case broken away to show a portion of the fan section and the compression section of the engine.

A gas turbine engine embodiment of the invention is illustrated in FIG. 1. The principal sections of the engine include a compression section 10, a combustion section 12 and a turbine section 14. The compression section has a fan section 16 and at least one compressor as represented by the rearmost compressor 18, a portion of which is shown. An annular flow path 20 for a working medium fluid such as a working medium gas extends axially through the engine. A stator structure 22 circumscribes the working medium flow path. The stator structure includes an outer case 24. A rotor assembly inwardly of the outer case includes an array of rotor blades, as represented by the single rotor blade 26. The rotor assembly extends axially through the engine and has an axis of rotation A. Each blade of the array extends outwardly across the flow path into proximity with the outer case.

A first fluid $f_1$ is discharged from the rearmost compressor 18. A second fluid $f_2$ has a source of supply such as the fan section 16. A third fluid $f_3$ is discharged from the combustion section 12. The origin of each of these fluids is the working medium gas stream following the flow path 20. The temperature of the first fluid is higher than the temperature of the second fluid. The temperature of the third fluid is higher than the first fluid. The third fluid includes products of combustion.

A means for impinging the second fluid on the exterior of the outer case 24, such as the tubes 28, circumscribes the outer case. A means for flowing the second fluid, such as the conduit means 30 for cooling air, extends between the tubes and the fan section. A means for modulating the flow of the cooling air, such as the valve 32 attached to the conduit means, is adapted to respond to the temperature of the fluid discharged from the rearmost compressor. A means for stopping the flow of cooling air, such as the valve 34 attached to the conduit means, is adapted to respond to altitude. An actuator 36 having a barometric switch 38 responding to a barometer 40 is adapted to stop the flow of the cooling air below a predetermined altitude.

Figure 2:
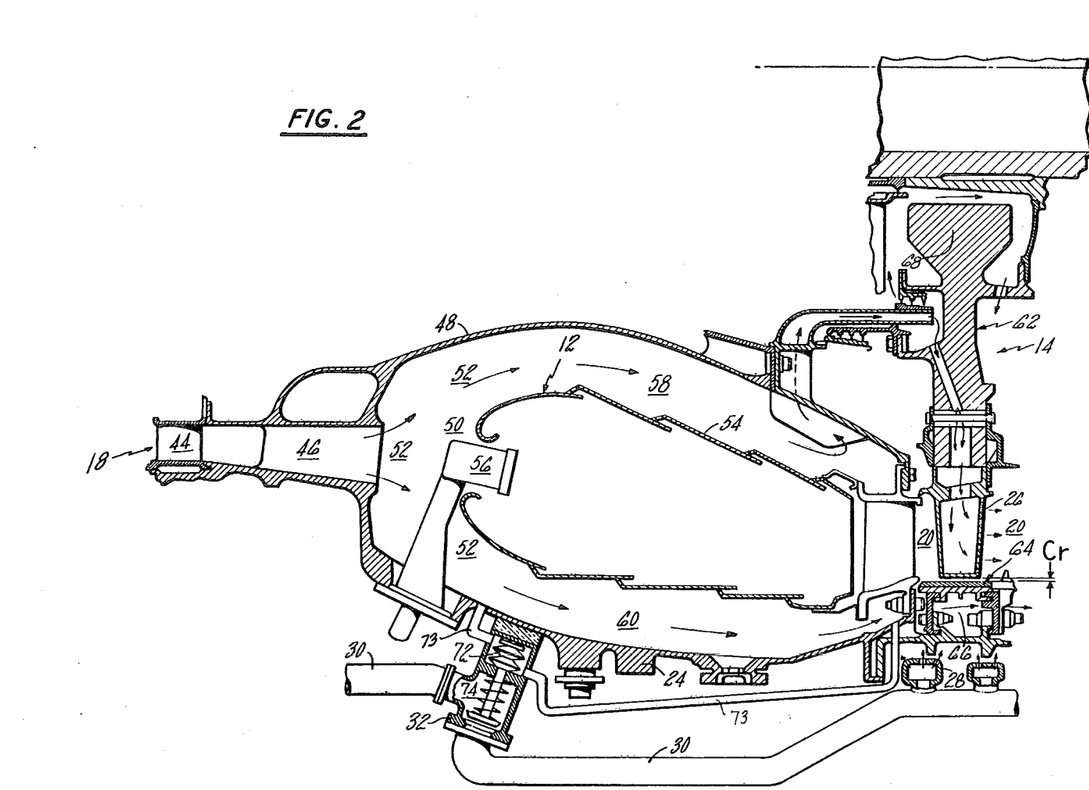
FIG. 2 is a sectional view of portions of the rearmost compressor, the combustion section and the turbine section of the engine.

FIG. 2 shows a portion of the rearmost compressor 18, a portion of the combustion section 12 and a portion of the turbine section 14. The rearmost compressor has a discharge vane 44 and a diffuser vane 46. An annular inner wall 48 and the outer case 24 downstream of the discharge vane enclose an annular cavity 50. A discharge region 52 of the rearmost compressor extends downstream into the annular cavity. The working medium gases have a temperature $T_d$ between the discharge vane and the diffuser vane. The discharge region is defined as the region downstream of the discharge vane wherein the temperature $T_{cd}$ of the working medium gases is within two percent of $T_d$ (°R). The gases in this region are defined as the first fluid.

The combustion section 12 is disposed in the annular cavity 50 downstream of the rearmost compressor. The combustion section includes an annular combustion chamber 54 and a plurality of fuel injectors as represented by the single injector 56. The injectors are in fluid communication with a source of fuel (not shown). The annular combustion chamber and the annular inner wall 48 define a means, such as the inner flow path 58, for flowing a portion of the working medium gases from the discharge region of the rearmost compressor to the turbine section. The annular combustion chamber and the outer case define a means, such as the outer flow path 60, for flowing a portion of the working medium gases from the discharge region of the rearmost compressor to the turbine section. The third fluid (products of combustion) is discharged from the combustion chamber into the turbine section along the annular flow path 20.

The turbine section 14 includes a coolable rotor stage assembly 62 and a coolable shroud 64 attached to the outer case. The coolable rotor stage assembly is in fluid communication through the inner flow path 58 with the discharge region 52 of the rearmost compressor. The coolable shroud is spaced radially from the outer case leaving a cavity 66 therebetween. The cavity 66 is in fluid communication through the outer flow path 60 with the discharge region 52 of the rearmost compressor. The coolable rotor stage assembly is formed of a coolable disk 68 and the array of coolable rotor blades 26. The rotor blades extend outwardly from the disk across the working medium flow path into proximity with a coolable shroud 64. The coolable shroud circumscribes the tips of the rotor blades and is spaced from the tips of the blades by a radial clearance $C_r$.

Figures 3, 4:
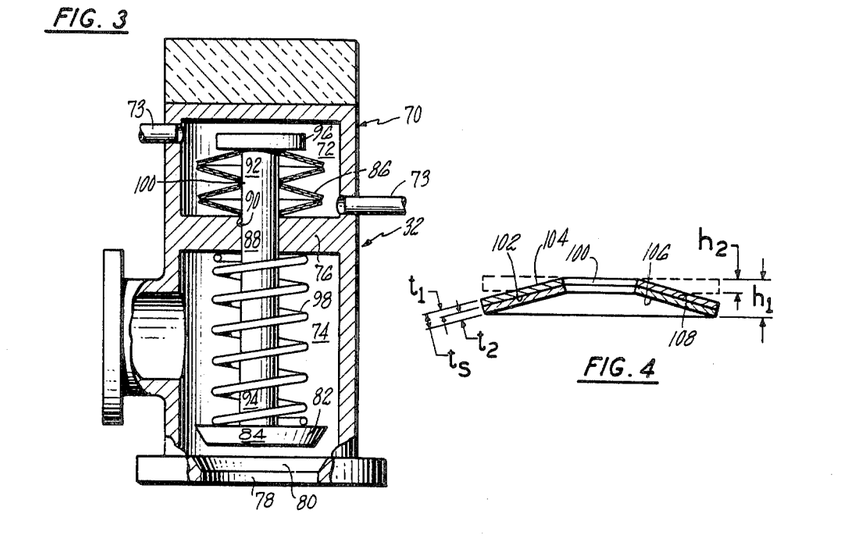
FIG. 3 is an enlarged view of a valve shown in the FIG. 2 view.
FIG. 4 is an enlarged view of a thermostatic bimetallic spring showing the spring in the installed condition at room temperature and at an elevated temperature (broken lines) during operation.

FIG. 3 is an enlarged cross sectional view of the valve 32 for modulating the flow of the first fluid. The valve has a housing 70. The housing has a first chamber 72 as shown in FIG. 2 and FIG. 3, a duct 73 places the first chamber in fluid (gas) communication with the discharge region 52 of the rearmost compressor and in fluid (gas) communication with the cavity 66. The housing has a second chamber 74 in gas communication with the source of the second fluid through the on-off valve 34. A wall 76 separates the first chamber from the second chamber. The housing has an outlet 78 from the second chamber which is in fluid (gas) communication with the interior of the second chamber and in fluid (gas) communication with the exterior of the second chamber. The outlet has a flow area $A_f$. A conical seat 80 extends circumferentially about the outlet. A means for changing by movement the flow area of the outlet, such as a valve head 82, is disposed in the second chamber. The valve head has a conical face 84 which is adapted geometrically to correspond to the conical seat. A plurality of thermostatic bimetallic springs 86 are disposed in the first chamber. A means adapted for connecting the springs to the means for changing the flow area, such as a valve stem 88, extends into both chambers. The wall is adapted by a guide means, such as hole 90, to receive the valve stem. The valve stem has a first end 92 in the first chamber and a second end 94 in the second chamber. The second end is attached to the valve head. A stop 96 is attached to the first end of the valve stem.

A means for exerting a biasing force, such as spring 98, is adapted to cause the valve head to engage the valve seat. The spring 98 is disposed between the valve head and the wall 76. The spring 98 has a spring rate which causes the spring to exert a force which is much less than the force exerted by the plurality of thermostatic bimetallic springs. Each of the thermostatic bimetallic springs, such as the initially coned (Belleville) springs, has a hole 100. The bimetallic springs are stacked together in series and are disposed in the first chamber between the stop and the wall such that the valve stem passes through the center of each of the springs.

FIG. 4 is an enlarged view of one of the thermostatic bimetallic springs. Each of the initially coned bimetallic springs has a thickness $t_s$. Each spring is comprised of a first initially coned spring having a first coefficient of thermal expansion and a thickness $t_1$ which is less than the thickness $t_s$. The first spring has a concave side 102 and a convex side 104. A second initially coned spring has a second coefficient of thermal expansion. The second coefficient of thermal expansion is not equal to the first coefficient of thermal expansion and is less than the first coefficient of thermal expansion. The second spring has a concave side 106 and a convex side 108. The second spring has a thickness $t_2$ which is less than the thickness $t_s$ ($t_2 < t_s$). The second spring is stacked in parallel with the first spring such that the concave side 102 of the first spring faces the convex side 108 of the second spring and is joined to the first spring by any suitable process such as brazing. The thickness of the first spring $t_1$, the thickness of the second spring $t_2$ and the thickness of the joining material (if any) is equal to $t_s$ the thickness of the thermostatic bimetallic spring. The dotted lines show the spring in a deflected position. As will be realized, the height h of the spring is inversely proportional to temperature.

Figure 5:
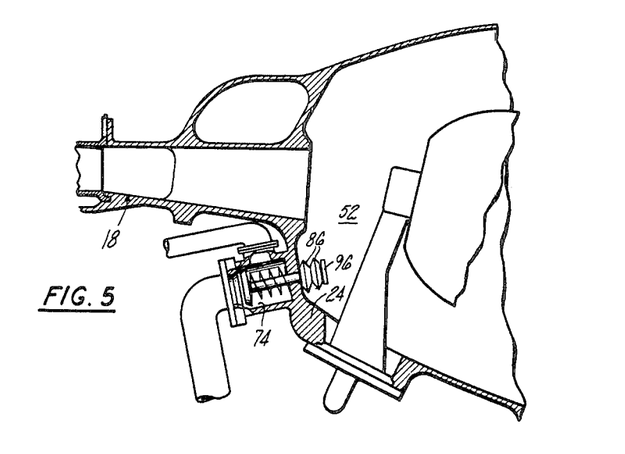
FIG. 5 is a cross section view corresponding to a portion of the FIG. 2 view and shows an alternate embodiment.

The thermostatic bimetallic springs may extend directly into the discharge region 52 of the rearmost compressor 18. Such a construction is shown in FIG. 5 an alternate embodiment to the structure shown in FIG. 1. In such a construction, a portion of the case 24 may bound the second chamber 74. The discharge region, with respect to the valve, is functionally equivalent to the first chamber 72.

Figure 6:
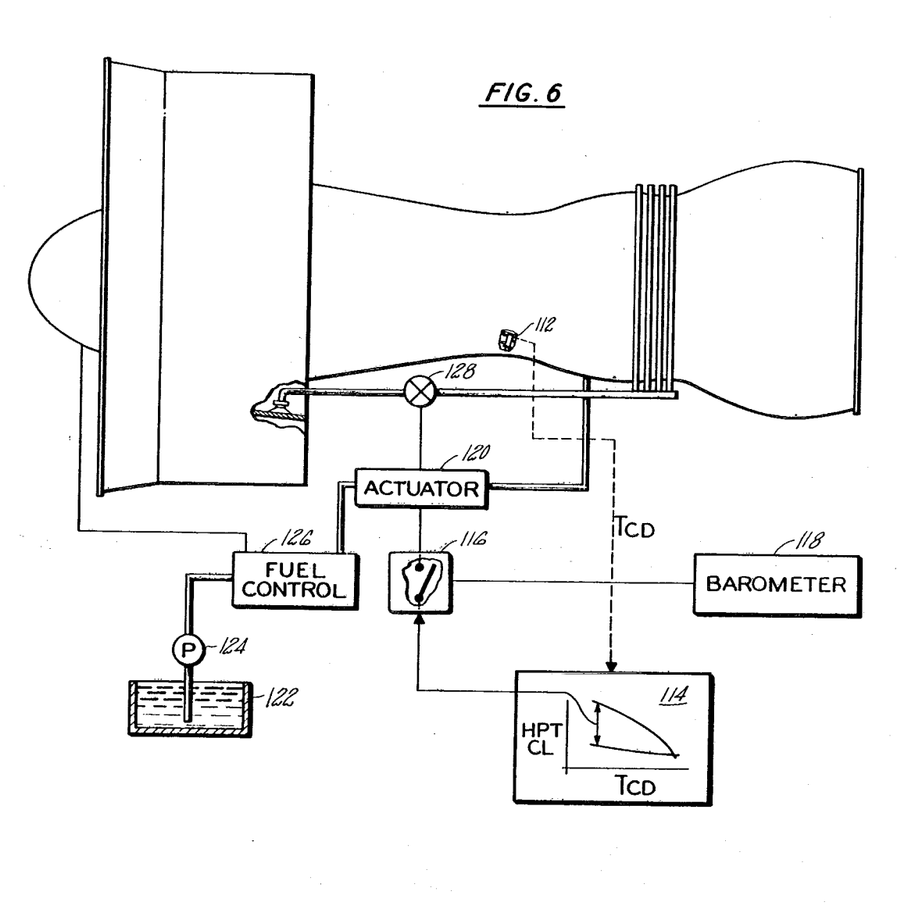
FIG. 6 is a side elevation view corresponding to the FIG. 1 view and shows a second alternate embodiment.

FIG. 6 is an alternate embodiment of the embodiment shown in FIG. 1 and has a remote sensor, such as a thermocouple 112, for sensing the temperature in the discharge region of the rearmost compressor. A computer means 114 is in electrical communication both with the sensing means and with a barometric switch 116. The barometric switch is in communication with a barometer 118. The barometric switch when closed places the computer means in electrical communication with an actuator 120. The actuator is also in fluid communication with a source of fuel 122 and a pump 124 for pressurizing the fuel through the fuel control 126. The pressure of the fuel enables the actuator to modulate the valve 128.

Figure 7:
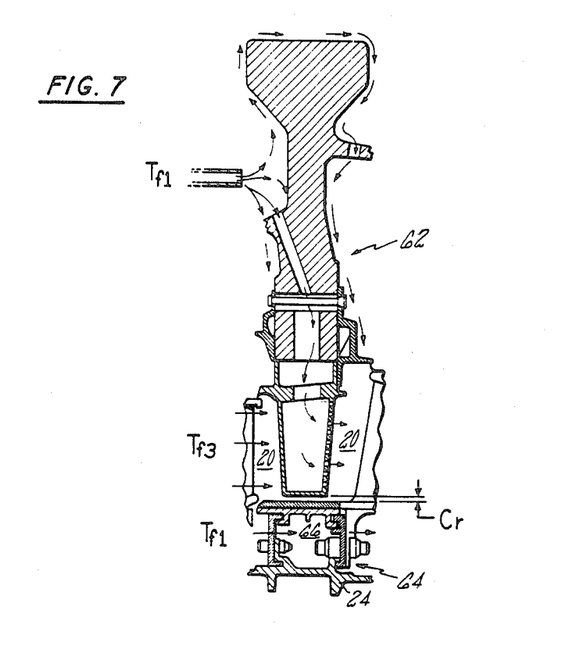
FIG. 7 is a diagrammatic view of a portion of the turbine section of the engine.
Figure 8:
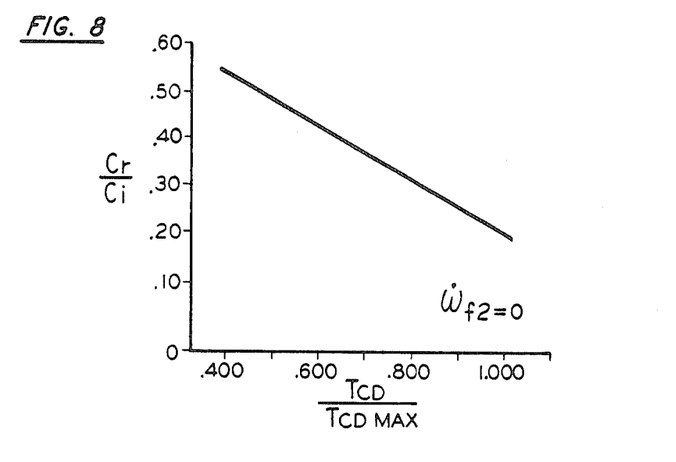
FIG. 8 is a graphical representation of the normalized radial clearance $C_r$ versus the normalized temperature of the compressor discharge region.

FIG. 7 is a diagrammatic view illustrating the cooling scheme of the rotor stage assembly 62, the coolable shroud 64 and the outer case 24. The valve 34 is set in the closed position interrupting the flow of the second fluid. The hot working medium gases having a temperature $T_{f3}$ are discharged from the combustion chamber 54 and are shown flowing along the annular flow path 20. The first fluid which is cooling air having a temperature $T_{cd}$ from the discharge region 52 of the rearmost compressor 18, is shown flowing around and through the coolable rotor stage assembly 62 and through the cavity 66. A substantially linear relationship between the temperature $T_{cd}$ of the first fluid and the clearance $C_r$ in the turbine section 14 results from the use of this cooling scheme. FIG. 8 is a graphical representation of this relationship and shows the clearance $C_r$ as a function of the temperature of the first fluid over the operating range of the engine divided by the maximum temperature of the first fluid ($C_r = f(T_{cd}/T_{cd,max})$. The temperature of the first fluid controls the flow of the second fluid impinging on the outer case.

FIG. 9 is a graphical representation of the actual clearance $C_r$ (curve $C_a$) between the tips of the array of rotor blades 26 and the shroud 50 in the turbine section 14 against time during a typical flight cycle of eighty minutes from Sea Level Take Off (SLTO) to landing. The clearance $C_r$ is normalized by dividing the clearance $C_r$ by the initial clearance $C_i$. FIG. 9 and Table I show the power settings typically used over the flight cycle. Valve 34 is in the off position below 5000 feet (1500 m) and in the on position above 5000 ft.

TABLE I

| Period | Time Minutes | Valve | Power Setting | Pressure Altitude | Temperature |
|---|---|---|---|---|---|
| 1 | 0-4 | OFF | SLTO | <5000 Ft. (<1500 M.) | 71° F. (21° C.) |
| 2 | 5 | ON | Climb(Begin) | 5000 Ft. (1500 M.) | 41° F. (5° C.) |
| 2 | 10 | ON | Climb(Mid) | 20,000 Ft. (6250 M.) | −12° F. (−25° C.) |
| 2-3 | 20 | ON | Climb(End) Cruise(Begin) | 35,000 Ft. (10675 M.) | −66° F. (−54° C.) |
| 3 | 30 | ON | Cruise(Mid) | 35,000 Ft. (6250 M.) | −66° F. (−54° C.) |
| 3-4 | 40 | ON | Cruise(End) Descent(Begin) | 35,000 Ft. (10675 M.) | −66° F. (−54° C.) |
| 4 | 50 | ON | Descent(Mid) | 20,000 Ft. (6250 M.) | −12° F. (−25° C.) |
| 5 | 60 | OFF | Descent(End) Approach(Begin) | 5000 Ft. (1500 M.) | 71° F. (21° C.) |

The temperature of the working medium gases in the turbine section 14 is lowest at idle power and highest during SLTO. Accordingly, FIG. 9 shows that the clearance $C_r$ decreases as the working medium gases in the turbine section increase in temperature.

During the flight of an aircraft powered by a gas turbine engine, the power setting of the engine is initially set at a high level for Sea Level Take Off (period 1; hereinafter $P_1$). The power setting is decreased as the aircraft proceeds through its flight cycle from Sea Level Take Off, to maximum Climb ($P_2$), through Climb to 100% Cruise ($P_3$) and, continually decreases through Cruise to Descent ($P_4$). At the end of Descent ($P_{4-5}$) the power setting is increased above idle if the aircraft is placed in a holding pattern above the air field.

After maneuvering, the power setting is reduced further and the aircraft lands.

At the highest power setting (Sea Level Take Off) a large portion of the air discharged from the rearmost compressor 18 is ducted into the annular combustion chamber 54 as shown in FIG. 2. As the air is flowed into the combustion chamber, fuel is injected through the injectors 56 and burned with the air to form hot working medium gases. The gases are discharged into the turbine section 14. The hot working medium gases drive the rotor assembly causing the rotor disk 68 and the array of rotor blades 26 to rotate at high speeds.

As shown in FIG. 7 and FIG. 9, both the high speed rotation and the heat of the working medium gases affect the radial clearance $C_r$ between the rotating blades 26 and the circumscribing shroud 64. Rotation causes the rotating disk and blades to rapidly stretch outwardly a distance $L_r$. The distance $L_r$ is equal to the rotational growth $D_r$ of the disk 68 and the growth $B_r$ of the blade from rotation ($L_r = D_r + B_r$). In addition, the rotor blades are in intimate contact with the hot working medium gases and grow rapidly outwardly a distance $B_\alpha$ because of thermal expansion. As shown in FIG. 7 and FIG. 9, the tip of each rotor blade moves rapidly towards the circumscribing shroud in response to the mechanical and thermal growth. The initial radial clearance $C_i$ between the tips of the rotor blades and the circumscribing shroud permits the rapid growth of the disk and blades without destructive contact occurring between the blades and the circumscribing shroud. The initial radial clearance $C_i$ ($C_r = C_i$) decreases to a small value $Ca_1$ ($C_r = Ca_1$). The clearance $Ca_1$ is commonly called the first pinch point clearance.

The outer case 24 is also affected by the hot working medium gases. The outer case is relatively remote from the working medium gases as compared with the rotor blades 26 and is cooled by a portion of the cooling air (first fluid) ducted into the cavity 66 between the circumscribing shroud 64 and the outer case. The outer case responds thermally more slowly than does the blades but more quickly than does the rotor disk 68 which is bathed in cooling air and cooled internally by the cooling air. As the outer case is heated and reaches a quasi steady-state position, the outer case expands outwardly carrying the circumscribing shroud to a larger diameter moving a distance $C_\alpha$ and increasing the radial clearance $C_r$ between the tips of the rotor blades and the circumscribing shroud. The disk absorbs heat during SLTO and Climb from the working medium gases. The disk expands outwardly a distance $D_\alpha$ until the disk reaches a quasi steady-state condition. This thermal growth of the disk causes the rotor tips to move outwardly closer to the circumscribing shroud decreasing the clearance to a second small value $Ca_2$. The second radial clearance $Ca_2$ is commonly referred to as the second pinch point clearance.

During Sea Level Take Off (SLTO) and Climb, the first fluid (cooling air) from the discharge region 52 of the rearmost compressor 18 is flowing at all times through the first chamber 72 of the valve. The valve responds directly to temperature by transducing the temperature through a thermostatic bimetallic device into a displacement. The stack of initially coned springs 86 disposed in the first chamber senses the temperature of the first fluid and transduces that temperature into an overall length of the stack and thus into a displacement. As the temperature of the first fluid decreases, for example, as the engine encounters lower ambient temperatures, or as compressor performance deteriorates, or as the power setting of the engine is decreased, the length of the stack increases due to the design of the initially coned spring. The springs exert a force against the stop 96. The force is transmitted through the valve stem 88 to the valve head 82 and overcomes the bias force applied by the spring 98 acting against the valve head. The valve head moves away from the valve seat 80 a distance which is directly proportional to the absolute change in temperature of the first fluid.

At the time the aircraft has reached a predetermined altitude, such as 5000 feet (1500 m), the transient growth associated with Sea Level Take Off (SLTO) and the beginning of Climb has been accommodated. The barometric switch 38 closes activating the solenoid valve 34 to the on position placing the second fluid, such as the fan air, in fluid communication with the interior of the second chamber 74 of the valve 32. Fan air is flowed through the external tubes 28 and caused to impinge on the engine outer case 24 causing the case to shrink. The shrinking case moves the circumscribing shroud inwardly decreasing the radial clearance $C_r$ between the tips of the rotor blades 26 and the circumscribing shroud. The initially coned springs 86, the bias spring 98 and the geometrical relationship between the valve head 82 and the valve seat 80 in the first chamber are designed to ensure that the impinging air which positions the outer case causes the radial clearance $C_r$ to follow a predetermined schedule.

As shown in FIG. 9, the clearance $C_r$ decreases to a minimum during Climb and increases during Cruise and Descent to accommodate transient decreases in the clearance which result from sudden increases in the power settings. Such an increase in the power setting might occur as the aircraft performs a sudden maneuver.

FIG. 8 is a graphical representation of the relationship between the normalized temperature of the first fluid $$\left( \frac{T_{cd}}{T_{cdmax}} \right)$$

and the radial clearance $C_r$ between the blades 26 and the circumscribing shroud 64 with no cooling air impinging on the outer case ($\dot{W}_{f2} = 0$) of the turbine section 14. As shown in FIG. 8, cooling the disk 68, the blade 26 and the internal surfaces of the outer case 24 with the first fluid from the discharge region of the compressor, creates an internal structure wherein the radial clearance $C_r$ varies substantially linearly with compressor discharge temperature over that portion of the flight cycle during which cooling air is normally impinged on the exterior of the outer case. As shown in FIG. 9 and discussed above, this portion of a typical flight cycle begins after approximately five minutes of flight time at a preselected altitude of five thousand feet and continues during Climb through Cruise and Descent to 5000 feet. Causing the turbine clearance to be substantially linear with respect to compressor discharge temperature, establishes the compressor discharge temperature as an acceptable parameter for controlling the flow of cooling air impinging on the outer case. Using this particular parameter enables several benefits.

First, modulating the flow of the second fluid impinging on the outer case as a function of the temperature of the first fluid, provides a cooling system which takes into account the effect that changes in ambient temperature (curves $C_l'$, $C_l''$) have on the clearance $C_r$ because any change in ambient temperature is reflected as a change in compressor discharge temperature. This change in temperature significantly affects the clearance between structures inwardly of the outer case which are cooled by the first fluid. These structures are the rotor disk, the rotor blade, the shroud and the interior of the outer case. The variation in compressor discharge temperature is significant for these internal structures because of the high heat transfer coefficients associated with the internal cooling air system. The change in temperature of the first fluid also has a significant impact on the temperatures of the rotor blade which is bathed in the hot working medium gases entering the turbine. For the rotor blades, the turbine inlet temperature (°R or °K.) is approximately a constant multiple of the temperature $T_{cd}$ of the discharge region of the compressor during that portion of the flight cycle during which the fan cooling air (second fluid) is normally impinged on the outer case. In addition, a change in the fan air temperature $T_{f2}$ (second fluid) does not have a significant effect on the clearance $C_r$ as compared to the effect that the temperature of the first fluid ($T_{f1} = T_{cd}$) has on the clearance $C_r$. The cooling air impinged on the outer case has a low average heat transfer coefficient as compared with the heat transfer coefficients of the internal cooling air system. Typically the differences may be a factor of eight. The effect on clearance associated with the impinging air is primarily due and most strongly a function of the cooling air flow rate. This flow rate is proportional to the flow area of the outlet of the second chamber.

Secondly, this cooling system takes into account the effect that component deterioration, such as deterioration of the compressor (curve $C_l'''$) has on the clearance $C_r$. Deterioration of the compressor causes a decrease in the discharge temperature of the compressor. This decrease in temperature has an effect which is analogous to a decrease in ambient temperature and is accommodated by the cooling system as is a change in ambient temperature. Accordingly by controlling the flow rate $w_{f2}$ of the second fluid (external air) impinging on the outer case with the temperature $T_{f1}$ of the first fluid (compressor discharge air) and using the first fluid to cool the internal components, a turbine structure is provided wherein the clearance $C_r$ is established as a function of the compressor discharge temperature and is relatively insensitive to changes in temperature resulting from component deterioration and changes in ambient temperature.

The valve 132 shown in FIG. 5 operates in a similar fashion to the valve shown in FIGS. 1, 2, and 3. The sole difference is the absence of a second chamber attached to the valve. The discharge region 52 of the rearmost compressor 18 is functionally equivalent to the second chamber of valve 32. The functional operations of the two valves are equivalent.

In the alternate embodiment shown in FIG. 6, the temperature in the discharge region 52 of the rearmost compressor 18 is sensed by the means for sensing temperature, the thermocouple 112. An electrical signal is sent through the computer means 114. The computer means generates a signal proportional to the amount of cooling air needed to obtain the desired clearance. The barometer 118 closes the barometric switch 116 in response to pressure altitude. With the barometric switch 116 in the closed position, the signal from the computer means passes to the actuator 120. The actuator positions the valve to regulate the flow of cooling air. The power for the actuator to position the valve may be supplied by the fuel as it is flowed from the pressurizing pump to the fuel injectors 56 in the combustion chambers.

Figure 10:
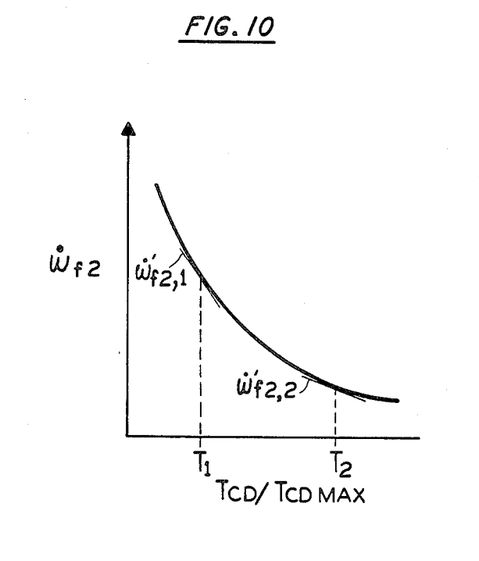
FIG. 10 is a graphical representation of the rate of flow $\dot{w}_2$ of the second cooling fluid versus the normalized temperature of the first fluid which flows from the compressor discharge region of the rearmost compressor.

FIG. 10 is a graphical representation of the rate of flow of the second fluid (external fan air) as a function of the temperature of the first fluid. Because the clearance $C_r$ grows larger as the compressor discharge temperature is decreased, the fan air flow is increased at an increasing rate. As the flow $w_{f2}$ is modulated, the first partial derivative of the flow rate $\dot{w}_{f2}$ of second fluid with respect to the temperature of the fluid discharged from the rearmost compressor $$\left( \frac{\partial \dot{w}_{f2}}{\partial T_{cd}} \right)$$

is negative at a first temperature $T_1$ and has a value $\dot{w}_{f2',1}$. At a second temperature $T_2$ which is greater than $T_1$, the first partial derivative of the flow rate of the second fluid with respect to the temperature of the fluid discharged from the rearmost compressor has a second value $\dot{w}_{f2',2}$ which is negative. As may be seen from the graphical representation of the flow rate with respect to temperature, the absolute value of $\dot{w}_{f2',1}$ is greater than the absolute value of $\dot{w}_{f2',2}$ ($|\dot{w}_{f2',1}| > |\dot{w}_{f2',2}|$).

Although the invention has been shown and described with respect to preferred embodiments thereof, it should be understood by those skilled in the art that various changes and omissions in the form and detail thereof may be made therein without departing from the spirit and the scope of the invention.

We claim:

1. In an axial flow gas turbine engine of the type which includes a compression section and a turbine section, the compression section including a rearmost compressor, a discharge region downstream thereof, and a first fluid which is discharged from the rearmost compressor into the discharge region, the turbine section including a coolable outer case having an exterior, a portion of a coolable rotor assembly inwardly of the outer case, the coolable rotor assembly having an array of rotor blades each blade having a tip, a coolable shroud inwardly of the outer case which circumscribes the tips of the rotor blades and which is spaced from the tips of the blades by a radial clearance, the engine further having a second fluid and a means for impinging the second fluid on the exterior of the outer case to adjust the radial clearance between the tips of the rotor blades and the shroud, the engine further including means for modulating the flow of the second fluid as a function of engine temperature, the improvement which comprises:

means for flowing a portion of the first fluid from the discharge region of the rearmost compressor to the coolable rotor assembly;

means for flowing a portion of the first fluid from the discharge region of the rearmost compressor to the coolable shroud; and means responsive to the temperature of the first fluid for modulating the flow of the second fluid, wherein the means for modulating the flow of the second fluid is responsive to the temperature of the first fluid discharged from the rearmost compressor to take into account the effect that changes in ambient air temperature and component deterioration have on said radial clearance between the rotor tips and the coolable shroud inwardly of the outer case.

2. The axial flow gas turbine engine of claim 1 wherein the means responsive to the temperature of the first fluid for modulating the flow of the second fluid has a thermostatic bimetallic device directly responsive to temperature for transducing the temperature of the first fluid into a displacement.

3. The axial flow gas turbine engine of claim 2 wherein the engine has a source of cooling air and the second fluid is the cooling air and wherein the means for modulating the flow of cooling air further includes
a housing having
a first chamber in gas communication with the discharge region of the rearmost compressor and in gas communication with the coolable shroud,
a second chamber in gas communication with the source of cooling air,
an outlet from the second chamber in gas communication with the second chamber and in gas communication with the means for impinging cooling air on the exterior of the outer case, said outlet having a flow area;
a means disposed in the second chamber for changing by movement the flow area of the outlet;
a plurality of bimetallic springs stacked together and disposed in the first chamber having an axial length which is a function of temperature;
a member connecting the bimetallic springs in the first chamber to the means for changing the flow area;
wherein a change in the temperature of the first fluid causes a change in the length of the bimetallic springs and a predetermined movement of the means for changing the flow area of the outlet to enable regulation of the flow of the cooling air.

4. In a method for controlling a radial clearance between an array of rotor blades of a rotor assembly and a circumscribing shroud in the turbine section of a gas turbine engine, the engine having a compression section and a discharge region downstream thereof, the compression section including a rearmost compressor which discharges a first fluid into the discharge region, the engine having a turbine section, the turbine section including a rotor assembly and rotor blades and including a shroud spaced radially from the blades leaving a radial clearance therebetween, the engine having an outer case in the turbine section outwardly of the rotor blades and the circumscribing shroud, the case being attached to the shroud and having an exterior, and the engine having a source for a second fluid for cooling the exterior of the outer case and having means for modulating the flow of the second fluid as a function of engine temperature, the improvement comprising the steps of:
cooling the shroud inwardly of the outer case with the fluid discharged from the rearmost compressor;
cooling the rotor assembly inwardly of the outer case with the fluid discharged from the rearmost compressor;
cooling the exterior of the outer case with the second fluid;
sensing the temperature of said fluid discharged from the rearmost compressor;
modulating the flow of the second fluid such that the flow rate of the second fluid is a function of the temperature of the fluid discharged from the rearmost compressor and varies inversely with respect to said temperature;
wherein the step of modulating the flow of the second fluid takes into account the effect that changes in ambient air temperature and component deterioration have on the radial clearance between the rotor blades and stator shrouds inwardly of the outer case.

5. The method for controlling a radial clearance of claim 4 wherein the gas turbine engine has a fluid flow path extending between the discharge region of the rearmost compressor and the circumscribing shroud of the turbine section and wherein the step of sensing the temperature of said fluid discharged from the rearmost compressor is performed at a location in said fluid flow path.

6. The method for controlling a radial clearance of claim 5 wherein the gas turbine engine has a duct for bounding said fluid flow path, the duct being outwardly of the outer case, in fluid communication with the circumscribing shroud and in fluid communication with the discharge of the rearmost compressor wherein the step of cooling the shroud inwardly of the outer case includes the step of flowing the fluid discharged from the rearmost compressor rearwardly through said duct.

7. The method for controlling a radial clearance of claim 4 wherein the step of modulating the flow rate of the second fluid as a function of the temperature includes the step of modulating the flow rate such that the first partial derivative of the flow rate of the second fluid with respect to the temperature of the fluid discharged from the rearmost compressor at a first temperature $T_1$ is negative and has a value $\dot{w}_{f2',1}$ and at a second temperature $T_2$ greater than $T_1 (T_1 > T_2)$ has a second value $\dot{w}_{f2',2}$ which is negative wherein the absolute value of $\dot{w}_{f2',1}$ is greater than the absolute value of $\dot{w}_{f2',2}$ ($|\dot{w}_{f2',1}| > |\dot{w}_{f2',2}|$).

8. The method for controlling a radial clearance of claim 4 wherein the gas turbine engine has a duct outwardly of the outer case in fluid communication with the circumscribing shroud and in fluid communication with the discharge of the rearmost compressor, wherein the step of sensing the temperature of said first fluid includes the step of flowing the fluid discharged from the rearmost compressor rearwardly through the duct to said means for modulating the flow of the second fluid, wherein the step of cooling the shroud inwardly of the outer case includes the step of flowing the fluid discharged from the rearmost compressor rearwardly through said duct from said means for modulating the flow of the second fluid to said shroud.

* * * * *